United States Patent
Beyene et al.

(10) Patent No.: US 6,443,437 B1
(45) Date of Patent: Sep. 3, 2002

(54) SUSPENSION STRUT WITH DAMPING

(75) Inventors: Samson Beyene; Charles J. Leingang; Peter Masterson, all of Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/572,124

(22) Filed: May 17, 2000

(51) Int. Cl.$^7$ ................................................. F16F 5/00
(52) U.S. Cl. ............... 267/64.26; 267/195; 267/294; 267/64.15; 267/141.1
(58) Field of Search ................. 267/195, 292, 267/293, 294, 64.15, 64.25, 64.26, 141.1, 201

(56) References Cited

U.S. PATENT DOCUMENTS

| | | | | |
|---|---|---|---|---|
| 2,463,366 A | * | 3/1949 | Evans | 267/294 |
| 2,600,334 A | * | 6/1952 | Schlegal | 267/201 |
| 2,639,141 A | * | 5/1953 | Gabriel | 267/293 |
| 3,039,757 A | | 6/1962 | Barr | 267/1 |
| 3,259,397 A | * | 7/1966 | Doennecke | 267/293 |
| 3,434,708 A | * | 3/1969 | Hawk | 267/293 |
| 3,480,268 A | * | 11/1969 | Fishbaugh | 267/141.1 |
| 3,537,696 A | * | 11/1970 | Webster | 267/195 |
| 3,713,666 A | * | 1/1973 | Cheers et al. | 267/293 |
| 4,085,832 A | * | 4/1978 | Gaines et al. | 267/293 |
| 4,475,722 A | | 10/1984 | Paton et al. | 267/9 C |
| 4,566,678 A | * | 1/1986 | Anderson | 267/141.1 |
| 4,756,512 A | | 7/1988 | Toms, Jr. | 267/70 |
| 4,997,171 A | * | 3/1991 | Toms | 267/294 |
| 5,104,101 A | * | 4/1992 | Anderson et al. | 267/293 |
| 5,375,823 A | * | 12/1994 | Navas | 267/195 |
| 5,460,357 A | * | 10/1995 | Stewart | 267/294 |
| 5,884,959 A | * | 3/1999 | Hillen | 267/64.26 |
| 6,059,276 A | * | 5/2000 | Dutzi et al. | 267/293 |

* cited by examiner

Primary Examiner—Jack Lavinder
Assistant Examiner—Devon Kramer
(74) Attorney, Agent, or Firm—Michael M. Gnibus; David D. Beatty

(57) ABSTRACT

A suspension strut includes a housing assembly including first and second opposed housing members. The first and second housing members are relatively movable along an axis. At least the first housing member includes an engagement surface. At least one compressible spring member is interposed between the first and second housing members. The spring member includes a peripheral portion. The strut is configured such that, when the first and second housing members are relatively displaced along the axis in a prescribed direction, the spring member is axially compressed to provide a spring force opposing further relative displacement between the first and second housing members in the prescribed direction, and the peripheral portion frictionally engages the engagement surface over an area of engagement to provide dynamic damping between the first and second housing members.

17 Claims, 7 Drawing Sheets

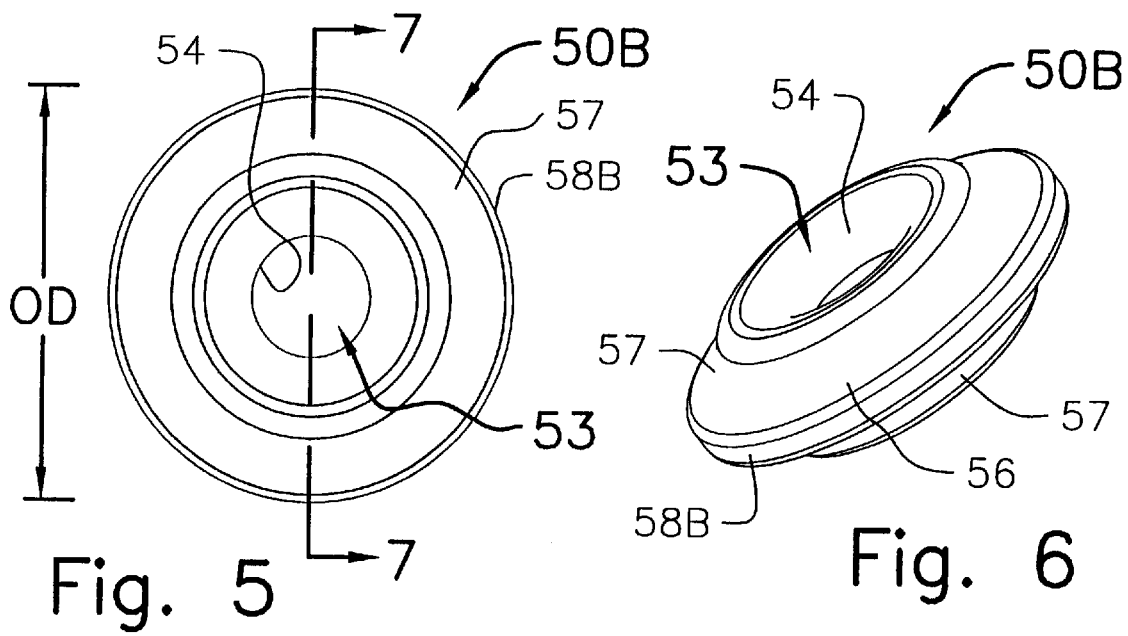
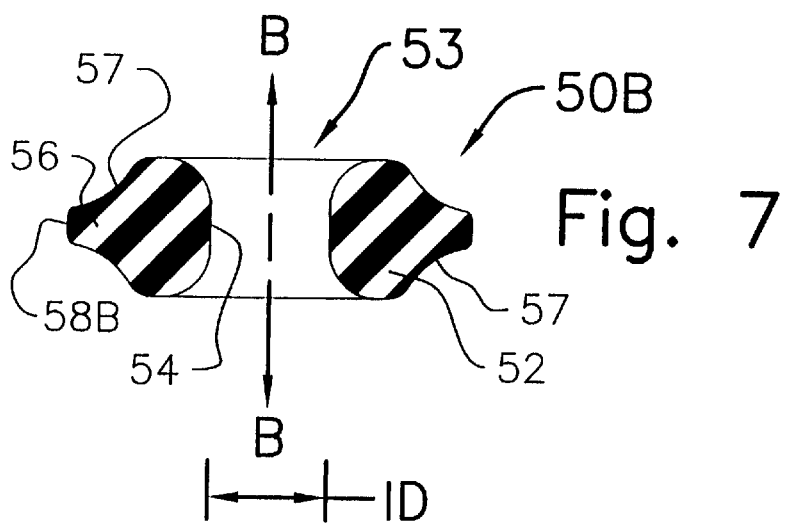
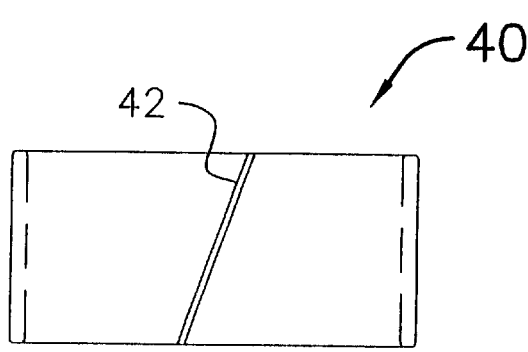
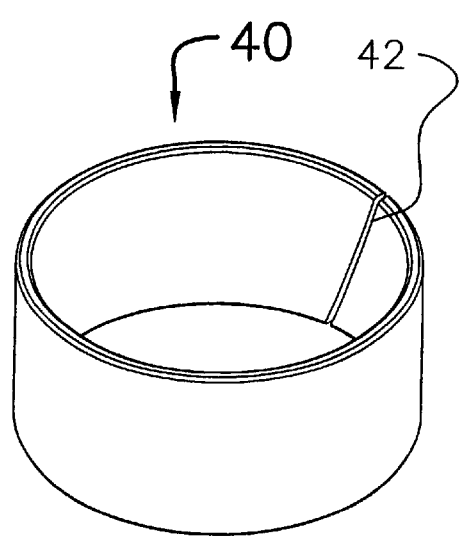
Fig. 5  Fig. 6  Fig. 7  Fig. 8  Fig. 9

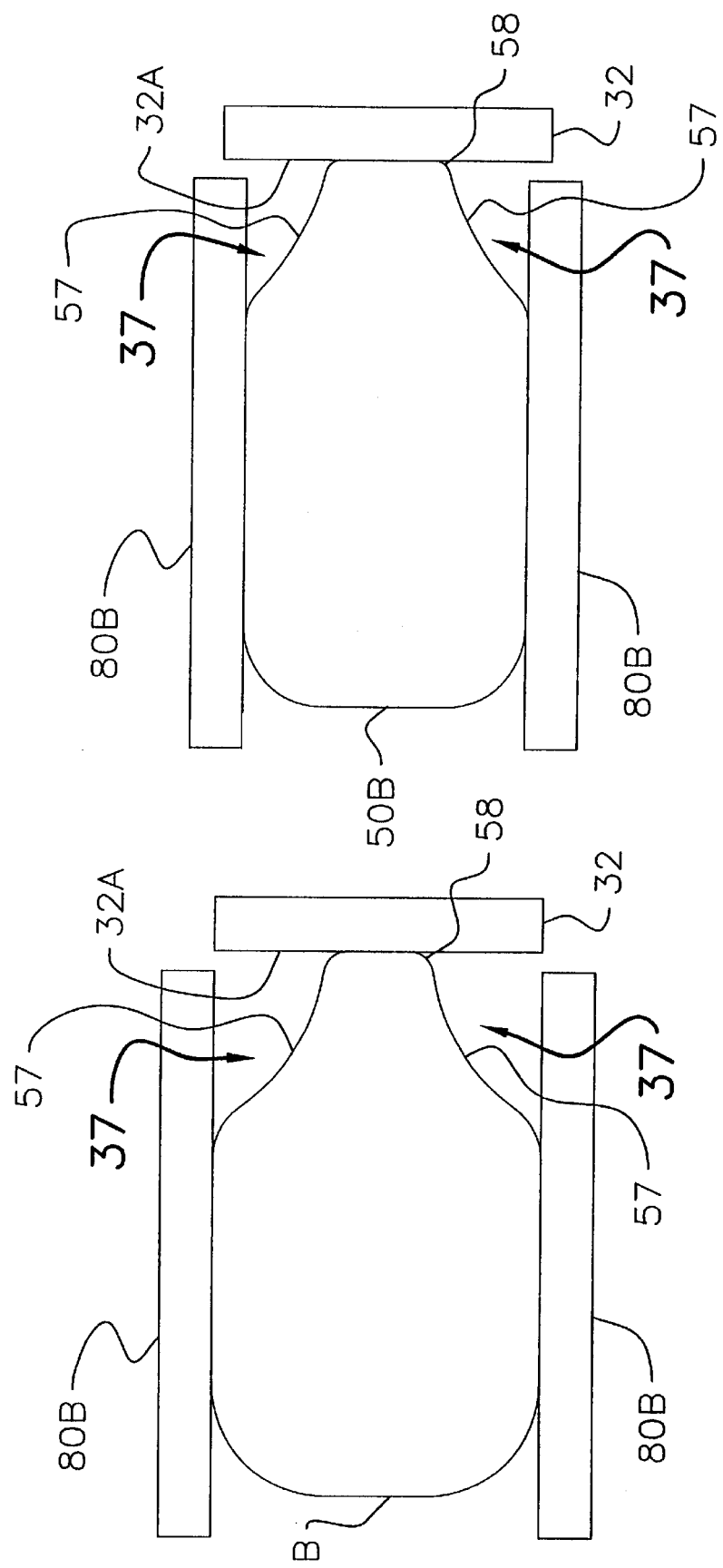

SUSPENSION STRUT WITH DAMPING

FIELD OF THE INVENTION

The present invention relates to suspension struts and, more particularly, to suspension struts having damping.

BACKGROUND OF THE INVENTION

Suspension struts may be employed to join a suspended mass with a suspending mass, for example, a vehicle body with vehicle wheels and/or other suspension components. For example, such suspension struts may be incorporated in mining vehicles and similar vehicles. The suspension struts of mining vehicles and the like may be subjected to large variations in load. More particularly, when a mining vehicle is empty, the suspension strut may bear only the relatively small load of the vehicle body. However, the full cargo load for which the vehicle is designed may exceed 80 tons. The suspension struts for such vehicles should be capable of sufficiently absorbing wheel travel or vibration for any load or displacement within the designed range of the vehicle in order to reduce or eliminate disruption of the vehicle or its cargo. It is particularly desirable to avoid bottoming out of the suspension strut in use. The suspension struts should also be durable, both in terms of fatigue resistance and resistance to damage from impacts, overloading and various environmental hazards.

It is also desirable to minimize rocking and oscillation of the mining vehicle or other suspended mass. To minimize these unsettling movements, damping of the suspension strut's compression and/or extension may be required.

SUMMARY OF THE INVENTION

According to embodiments of the present invention, a suspension strut includes a housing assembly including first and second opposed housing members. The first and second housing members are relatively movable along an axis. At least the first housing member includes an engagement surface. At least one compressible spring member is interposed between the first and second housing members. The spring member includes a peripheral portion. The strut is configured such that, when the first and second housing members are relatively displaced along the axis in a prescribed direction, the spring member is axially compressed to provide a spring force opposing further relative displacement between the first and second housing members in the prescribed direction, and the peripheral portion frictionally engages the engagement surface over an area of engagement to provide dynamic damping between the first and second housing members.

Preferably, the area of engagement between the peripheral portion and the engagement surface increases with relative displacement between the first and second housing members in the prescribed direction and thereby increases the amount of the dynamic damping. Preferably, the housing assembly and the spring member are relatively arranged and configured such that deflection of the spring member responsive to axial compression is limited by the housing assembly.

The spring member may be formed of an elastomeric material. The spring member may be toroidally shaped. A plurality of the spring members may be provided in stacked relation. A separator plate may be interposed between at least two of the spring members.

The spring member may include a projection extending from an outer periphery of the spring member, the peripheral portion forming a part of the projection. The first housing member may include a tubular sleeve having an inner surface with the engagement surface forming a part of the inner surface.

The suspension strut may include a second tube forming a part of the second housing member and slidably received in the first tube, the second tube having a second engagement surface, and a second spring element disposed in the second tube and frictionally engaging the second engagement surface. A spacer may be interposed between the first spring element and the second spring element. This spacer may be axially displaceable relative to each of the first and second tubes. A bearing member may surround the second tube and be interposed between said first and second tubes.

Objects of the present invention will be appreciated by those of ordinary skill in the art from a reading of the Figures and the detailed description of the preferred embodiments which follow, such description being merely illustrative of the present invention.

BRIEF DESCRIPTION OF THE DRAWINGS

FIG. 5 is a top plan view of a spring element forming a part of the suspension strut of FIG. 1;

FIG. 6 is a perspective view of the spring element of FIG. 5;

FIG. 7 is a cross-sectional view of the spring element of FIG. 5 taken along the line 7–7 of FIG. 5;

FIG. 8 is a side elevational view of a bearing member forming a part of the suspension strut of FIG. 1;

FIG. 9 is a perspective view of the bearing member of FIG. 8;

FIG. 14 is a schematic view of a spring element, adjacent separator plates and a tube wall forming a part of the suspension strut of FIG. 1;

FIG. 15 is a schematic view of the components shown in FIG. 14, but wherein an increased load is applied to the spring element.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
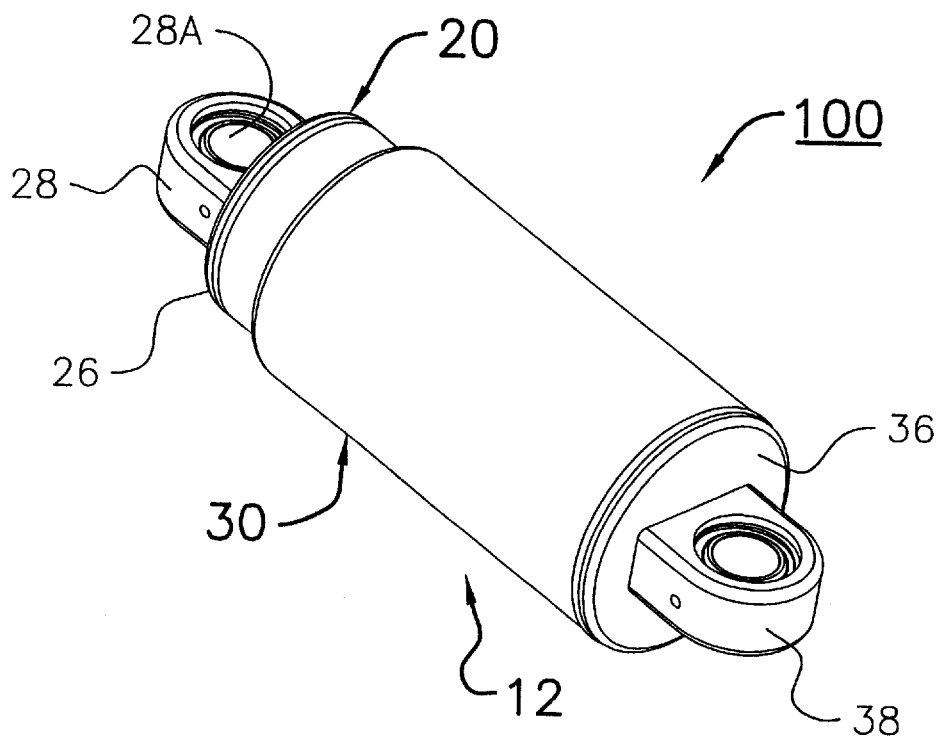
FIG. 1 is a perspective view of a suspension strut according to embodiments of the present invention.
Figure 2:
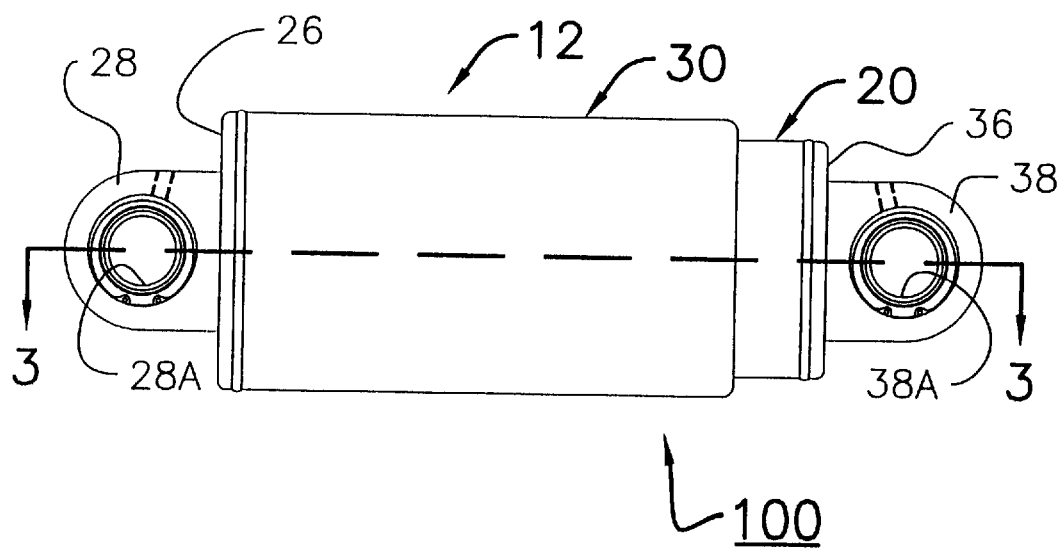
FIG. 2 is a side elevational view of the suspension strut of FIG. 1.
Figures 3, 4:
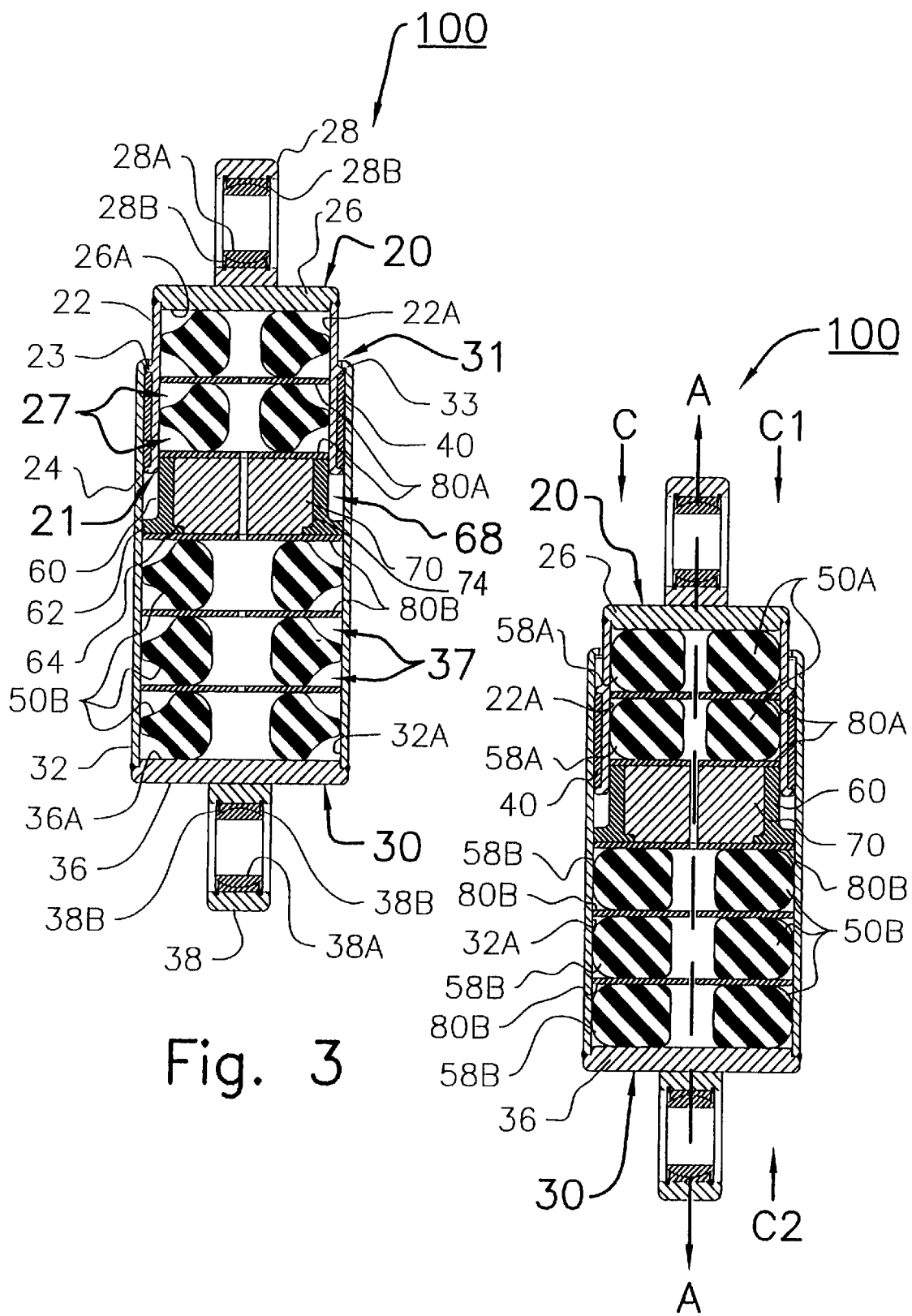
FIG. 3 is a cross-sectional view of the suspension strut of FIG. 1 taken along the line 3—3 of FIG. 2, wherein the suspension strut is in a fully extended position.
FIG. 4 is a cross-sectional view of the suspension strut of FIG. 1 viewed along the same cross-section as shown in FIG. 3, but wherein the suspension strut is in a compressed condition.

With reference to FIGS. 1–4, a suspension strut according to embodiments of the present invention is shown therein and generally designated 100. The suspension strut 100 includes a housing assembly 12 including a bottom housing 30 and a top housing 20 slidably and telescopingly received in the bottom housing 30. With reference to FIG. 3, the bottom housing 30 includes a bottom tube 32 and a bottom end plate 36 connected (for example, by welding or other means) to the bottom tube 32. A bottom bearing plate or boss 38 is connected to the bottom end plate 36. A spherical bearing 38A is press fit into the bearing plate 38 and is also held in place by retaining rings 38B on either side. The top housing 20 includes a top tube 22 and a top end plate 26 connected thereto. A lower portion of the top tube 22 is disposed within the bottom tube 32 and an upper portion of the top tube 22 extends out through the opening 31 of the bottom tube 32. A top bearing plate 28 (with a spherical bearing 28A press fit therein and further held in place by retaining rings 28B) is connected to the top end plate 26. The tubes 22, 32, the end plates 26, 36, and the bearing plates 28, 38 are preferably formed of steel or other suitable material.

In order to prevent over-extension of the suspension strut 100 (i.e., to prevent the top housing 20 from overly telescoping out of the bottom housing 30), the upper peripheral edge of the bottom tube 32 may be crimped as shown in FIG. 3, to form an inwardly extending, circumferential stop flange 33. The top tube 22 includes an upper circumferential stop flange 23 extending outwardly therefrom to cooperate with the stop flange 33. The stop flange 23 is preferably integrally formed with the top tube 22, but, alternatively, may be welded or otherwise secured to the top tube 22.

With reference to FIGS. 3, 4, 8 and 9, the top tube 22 also includes a lower circumferential stop flange 24. A cylindrical bearing member 40 is seated between the flanges 23 and 24 and surrounds the portion of the top tube 22 therebetween. The bearing member 40 is preferably formed of a resilient polymeric material. The bearing member 40 includes a slit 42 which allows the bearing member 40 to be temporarily expanded to install the bearing member over the flange 24. Preferably, the bearing member 40 is formed of a strong material having good wear and low friction characteristics such as oil-filled nylon.

As best seen in FIGS. 3, 5–7 and 13, three spring elements 50B are housed in the bottom housing 30 and two spring elements 50A are housed in the top housing 20. As shown in FIG. 3, the spring elements 50B are larger than the spring elements 50A. The spring elements 50A are preferably substantially identical to each other and the spring elements 50B are preferably substantially identical to each other. The spring elements 50A and 50B may be similarly shaped and may differ only in their relative dimensions. Turning to FIGS. 5–7, the spring element 50B shown therein is exemplary of various embodiments of the present invention and has a generally toroidal or "doughnut" shape. The spring element 50B has a main body 52 having an inner wall 54 defining an axial passage 53, which in turn defines an axis B—B (see FIG. 7). A circumferential rib or projection 56 is integrally formed with and extends radially outwardly from the body 52. The projection 56 includes upper and lower opposed, concave walls 57. The projection 56 further includes a generally axially extending outer wall 58B.

Preferably, the outer diameter OD (see FIG. 5) of the spring element 50B defined by the outer wall 58B is between about 95 and 120 percent of the corresponding inner diameter of the tube 32. Preferably, the inner diameter ID (see FIG. 7) of the spring element 50B defined by the inner wall 54 is between about 0 and 70 percent of the outer diameter OD. Preferably, the corresponding outer diameter of the spring element 50A is between about 95 and 120 percent of the corresponding inner diameter of the tube 22, and the corresponding inner diameter of the spring element 50A is between about 0 and 70 percent of the outer diameter. Preferably, each of the concave walls 57 has a radius of between about 0.5 and 5 inches, and more preferably, of between about 0.5 and 1.5 inches.

Each of the spring elements 50A, 50B is preferably formed from a resilient, elastomeric material. More preferably, the spring elements 50A, 50B are formed of natural rubber or urethane. Neoprene or nitrile may also be used. Preferably, the spring elements are molded. Other elastomers having different inherent damping characteristics may be used to adjust the strut damping over different damping levels.

Figure 10:
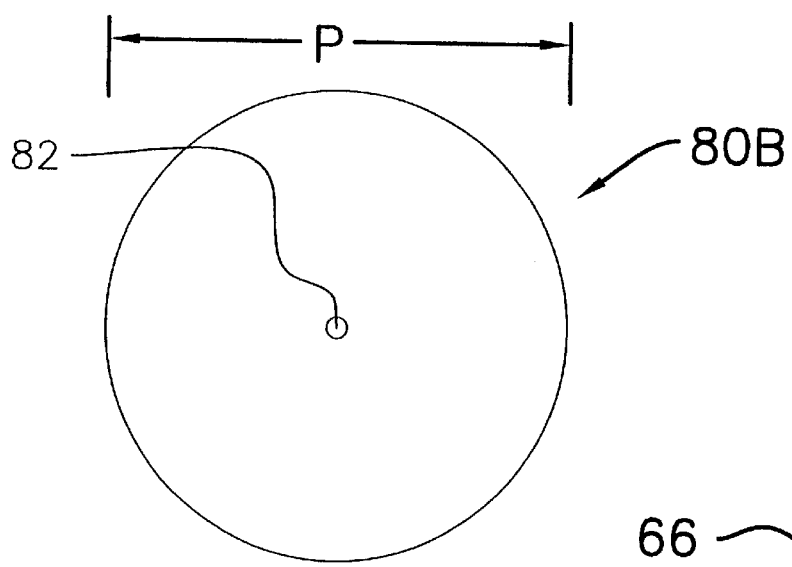
FIG. 10 is a top plan view of a separator plate forming a part of the suspension strut of FIG. 1.

A plurality of separator plates 80B and 80A are positioned adjacent and between respective ones of the spring elements 50A, 50B to provide a rigid loading surface. An exemplary separator plate 80B is shown in FIG. 10 and has a through hole 82 formed therein. Each of the separator plates 80B preferably has an outer diameter P of between about 0.001 and 0.10 inch less than the inner diameter of the tube 32. The separator plates 80A may differ from the separator plates 80B only in their outer diameters. Preferably, the outer diameter of each separator plate 80A is between about 0.001 and 0.10 inch less than the inner diameter of the tube 22. The separator plates 80A, 80B are preferably formed of a rigid material. Materials which may be used for the plates 80A, 80B include acetal, steel or any other suitable rigid material. The spring elements 50A, 50B may be bonded or adhered to the separator plates 80A, 80B.

Figure 13:
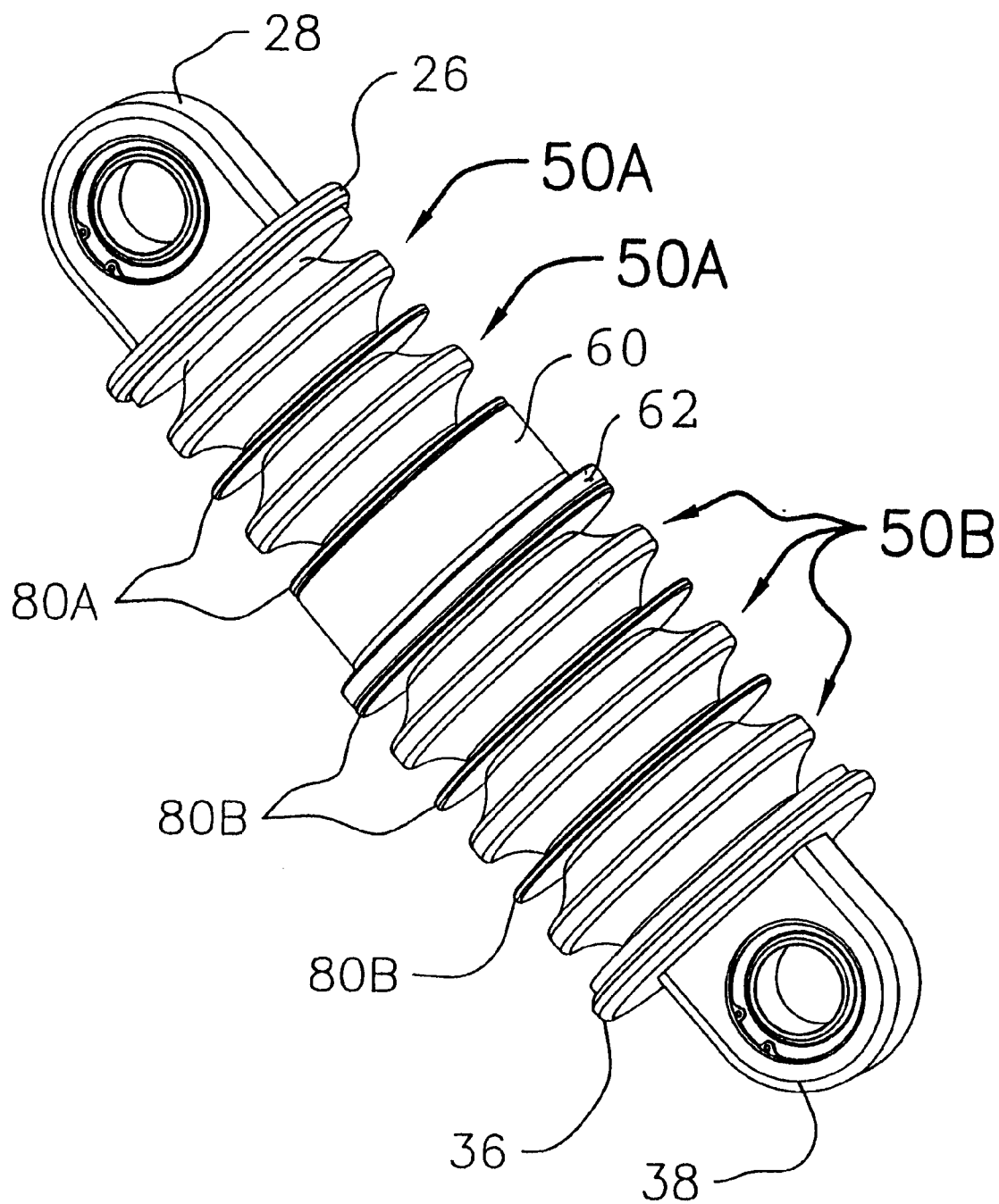
FIG. 13 is a perspective view of the suspension strut of FIG. 1, but wherein a top tube and a bottom tube thereof are removed for clarity.

As best seen in FIGS. 3 and 13, the lowermost spring element 50B is captured within the tube 32 and between the inner surface 36A of the end plate 36 and a separator plate 80B. The middle and upper spring elements 50B are captured by the tube 32 and between a pair of separator plates 80B. Similarly, the uppermost spring element 50A is captured within the top tube 22 and between the end plate surface 26A and a separator plate 80A. The lower spring element 50A is captured within the tube 22 and between a pair of separator plates 80A. As a result of the arcuate profiles of the projections 56, voids 37 surround the spring elements 50B and voids 27 surround the spring elements 50A.

Figure 11:
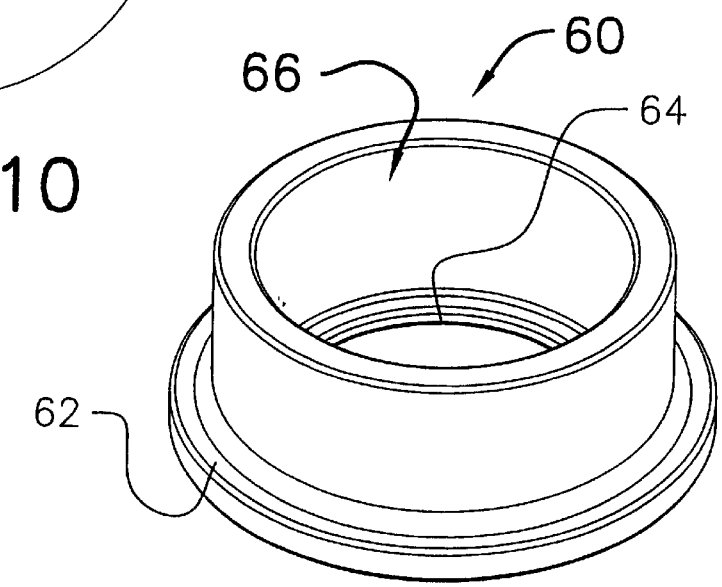
FIG. 11 is a perspective view of a bearing forming a part of the suspension strut of FIG. 1.
Figure 12:
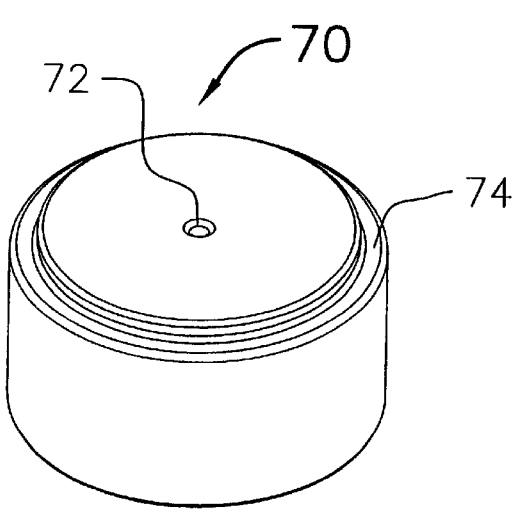
FIG. 12 is a perspective view of a spacer forming a part of the suspension strut of FIG. 1.

With continued reference to FIGS. 3 and 13, a spacer 70 and a spacer bearing 60 are interposed between the lowermost separator plate 80A and the uppermost separator plate 80B. The spacer 70 is received in a passage 66 (see FIG. 11) of the bearing 60. An inner flange 64 of the bearing 60 is received in a complementary circumferential recess 74 in the spacer 70 (see FIG. 12). The bearing 60 also includes a circumferential flange 62. The spacer 70 has a through passage 72 formed therein (see FIG. 12). Preferably, the spacer 70 is formed of a rigid material such as steel. Preferably, the spacer bearing 60 is formed of a rigid, relatively low friction material such as oil-filled nylon.

When the suspension strut 100 is in the fully extended position as shown in FIG. 3, an upper portion of the spacer bearing 60 and an upper portion of the spacer 70 extend through the lower opening 21 of the top tube 22. The flange 24, the flange 62, the outer surface of the spacer bearing 60 and the interior surface 22A of the tube 22 define a circumferential gap 68.

As shown in FIG. 3, none of the spring elements 50A, 50B, the separator plates 80A, 80B, the spacer bearing 60 and the spacer 70 are secured to the top tube 22 or to the bottom tube 32. Rather, these components are able to slide axially (i.e., up or down along the axis A—A of FIG. 4) relative to the tubes 22, 32. The bearing 40 is captured between the flanges 23 and 24 and therefore will slide with the top tube 22, but may slide axially relative to the bottom tube 32. The flanges 23, 24 and the bearing 40 may assist in resisting cocking loads on the suspension strut 100.

The suspension strut 100 may be installed by securing the top housing 20 directly or indirectly to a suspended mass, for example, a suspended vehicle body, by means of the mounting plate 28 and by securing the bottom housing 30 directly or indirectly to an unsuspended mass, for example, a wheel, by means of the mounting plate 38. In use, the suspension strut 100 may be alternately loaded such that the mounting plate 28 is urged in a direction C (see FIG. 4) toward the mounting plate 38 and unloaded such that the mounting plate 28 is urged away from the bottom mounting plate 38. Responsive to loading, the top housing 20 and the bottom housing 30 apply an axially compressive force to the spring elements 50A, 50B. The spring elements 50A, 50B assume a bulged, axially compressed condition as shown in FIG. 4. In turn, the top tube 22 is permitted to slide farther into the bottom tube 32 and the spacer bearing 60 and the spacer 70 are permitted to slide farther into the top tube 22.

As best seen in FIGS. 4, 14 and 15, the area and force of contact between the surfaces 58A, 58B and the surfaces 22A, 32A will each increase with axial compression of the respective spring elements 50A, 50B. For example, when a spring element 50B as shown in FIG. 14 which is subjected to a first load (which may be no load) is thereafter subjected to a greater load, the spring element 50B may assume a condition as shown in FIG. 15. That is, as the spring element 50B is subjected to the greater load, the spring element will become further axially. compressed and will in turn bulge or deform radially and axially to further fill the voids 37 (and also the central void defined within the spring element 50B) and increase the contact area between the outer surface 58B of the spring element and the inner surface 32A of the housing tube. Moreover, the radial load applied to the inner surface 32A by the spring element outer surface 58B is increased.

Notably, bulging (i.e., deformation) of the spring elements 50A, 50B is limited or resisted by the adjacent inner tube surfaces 22A, 32A, the adjacent separator plates 80A, 80B and the end plate surfaces 26A, 36A. As a result, as the areas of contact between the surrounding separator plates 80A, 80B and tubes 22, 32 increase and the loads applied to these components by the spring elements increase, the load required to further axially compress each spring element 50A, 50B increases at a substantially greater rate both because of the increasing spring rate and friction between the spring elements 50A, 50B and the surfaces 22A, 32A. Thus, bulging of the spring elements is limited by the housings 20, 30 in such a way as to contribute to the compression spring rates of the spring elements.

Figure 16:
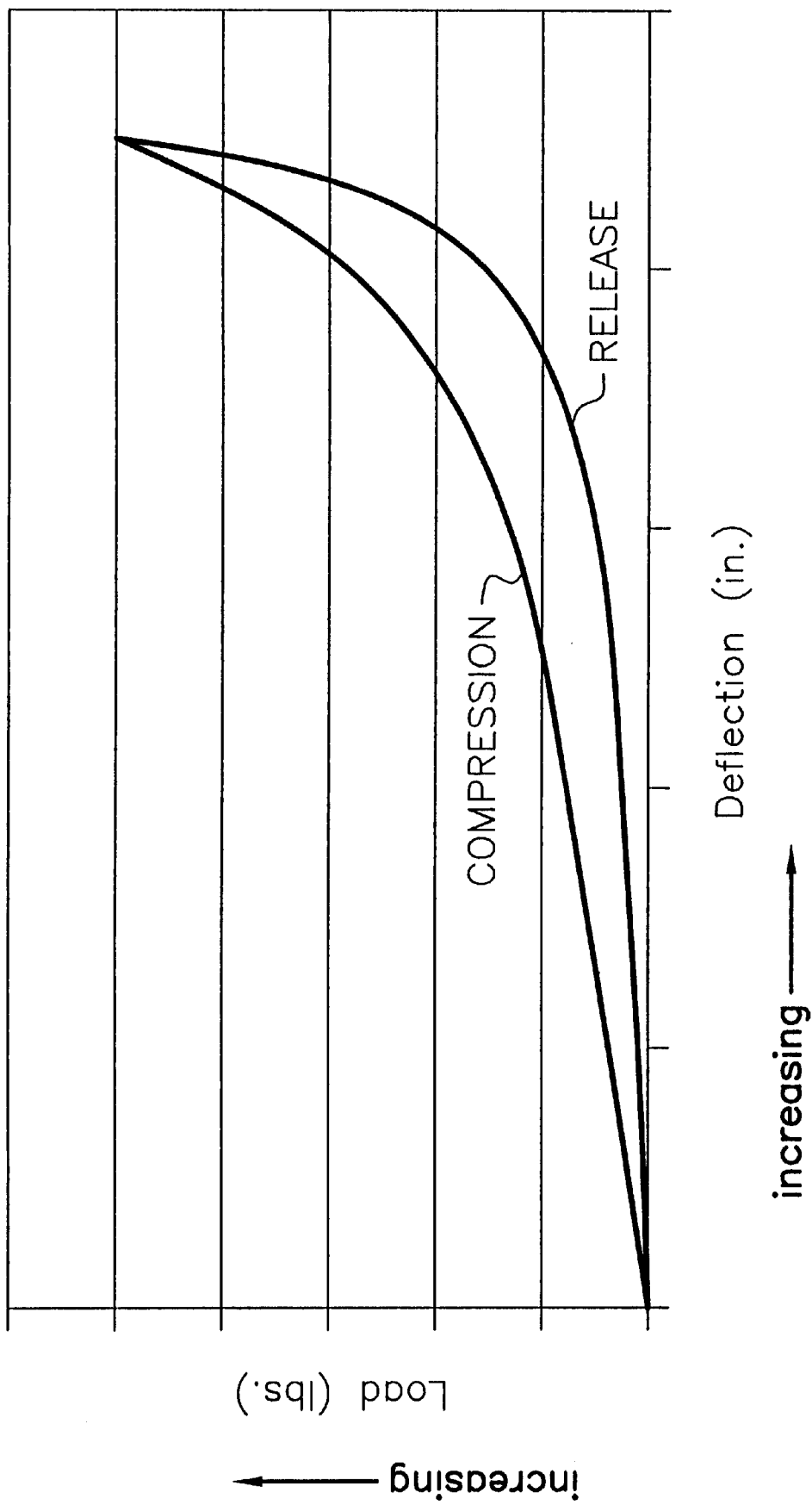
FIG. 16 is a load-deflection diagram including a first curve showing the compression response of the suspension strut of FIG. 1 and a second curve showing the release response of the suspension strut.

For example, as shown in FIG. 16 which shows exemplary compression and release load-deflection response curves for a suspension strut according to the present invention, the strut 100 will have a relatively low spring rate for low loads (and low deflections) as demonstrated by the first, extended, substantially linear portion of each curve. However, as the strut 100 approaches its designed maximum deflection, the spring rate increases rapidly (with the curve approaching vertical) responsive to additional deflection. In this manner, the strut 100 may provide a more linear and softer spring rate through a relatively large deflection range, thereby enhancing isolation of the suspended mass (e.g., under normal operating conditions), while also providing a relatively high spring rate as the deflection approaches the maximum allowed deflection (e.g., to prevent bottoming out of suspension components as a result of large impulse loads or overloading).

The constraints on bulging of the spring elements 50A, 50B described above also provide a desired spring rate to the strut 100 while reducing the degree of deformation of the spring elements required. Such reduction in deformation may reduce the strain on the spring elements, thereby increasing the service life of the strut.

Additionally, as the suspension strut 100 is axially compressed or released from compression, the circumferential outer surface 58B of each spring element 50B engages and slides along a portion of the inner surface 32A of the bottom tube 32. Similarly, the circumferential outer surface 58A of each spring element 50A engages and slides along a portion of the inner surface 22A of the top tube 22. The surfaces 22A, 32A and the material of the spring elements 50A, 50B may be selected to provide a prescribed amount of frictional resistance therebetween. This frictional resistance in turn may provide dynamic damping for the suspension strut 100. The frictional resistance provides both compression and rebound (i.e., release or extension) damping. In this manner, bouncing or oscillation of the suspended mass may be reduced or minimized.

As discussed above, responsive to increased axial compression, the contact areas and loads between the spring element surfaces 58A, 58B and the tube inner surfaces 22A, 32A increase. As a result, the frictional resistance between the spring element 50A, 50B and the inner surface 32A is increased, thereby providing increased damping. Hence, the suspension strut 100 may provide greater damping for greater deflections and, hence, for higher loads.

The foregoing discussion with reference to FIGS. 14 and 15 is exemplary of the behavior of each of the spring elements 50A, 50B and the respective tube surfaces 22A, 32A. However, the amount of frictional resistance provided by a given spring element 50A, 50B may vary. In particular, for a given compression of the suspension strut 100, those spring elements 50A, 50B near the spacer 70 will typically travel farther relative to the engaging surface 22A, 32A, and thereby may provide greater damping forces than those spring elements 50A, 50B nearer the end plates 26, 36, respectively.

The above-described frictional damping may provide a number of advantages. The frictional damping may supplement the material damping of the spring elements 50A, 50B (i.e., resulting from the material's loss factor). Accordingly, the maximum amount of damping which may be provided for a given selection of spring element material, spring element geometry and strut size may be increased. A wider range of damping rates may be provided across the range of deflection. Also, the rate of increase in damping as a function of deflection may be increased for greater deflections as compared to the rate of increase in damping as a function of deflection for lesser deflections (see FIG. 16). The materials of the spring elements 50A, 50B and the engaging surfaces 22A, 32A of the housing 12 may be selected to provide combinations of frictional and deformation properties as desired for each intended application. The damping rate of the strut may be more easily and effectively tuned by adjusting one or more of several parameters. For example, the damping behavior may be adjusted by:

1) changing the elastomeric material of the spring elements 50A, 50B;
2) changing the geometry of or eliminating the holes in the spring elements 50A, 50B;
3) changing the heights of the spring elements 50A, 50B;
4) changing the shapes of the spring elements 50A, 50B;
5) changing the frictional properties of the inner housing engagement surfaces 22A, 32A. This may be accomplished, for example, by selection of the materials of the tubes 22, 32 or by applying a coating such as a resin-bonded lubricant coating such as Emralon™ 333 coating available from Acheson Colloids Company of Port Huron, Mich., a teflon-based coating, or other suitable coatings;
6) providing a lubricant between the spring element surfaces 58A, 58B and the inner housing engagement surfaces 22A, 32A;
7) changing the outer diameters of the spring elements 50A, 50B relative to the corresponding inner diameters of the tubes 22, 32. For example, the outer diameters of the spring elements 50A, 50B may be substantially the same as or less than the corresponding inner diameters of the tubes 22, 32 so that the spring elements 50A, 50B are slip fit into the tubes 22, 32. Alternatively, the outer diameters of the spring elements 50A, 50B may be greater than the corresponding inner diameters of the tubes 22, 32 so that the spring elements 50A, 50B are interference fit into the tubes 22, 32, thereby providing one or more of the spring elements 50A, 50B with radial pre-compression. Accordingly, the strut 100 may allow substantial flexibility in tuning the damping of the strut, whether the desired state of tune is critical damped, under-damped or over-damped.

Holes 53, 72 and 82 facilitate air flow through the suspension strut 100, both for cooling and to minimize or eliminate the effects of compressing trapped air which may affect the spring rate or other performance of the suspension strut. Additionally, the holes 53, 72 and 82 may be used to assist in assembling and disassembling the strut. For example, a hooked wire or similar tool may be inserted through the holes to pull the stack of components out of the housing 12.

While the foregoing components have been described with regard to "top" and "bottom" orientations, it will be appreciated that the orientations may be reversed. Moreover, the suspension strut 100 may be horizontally oriented or oriented at an angle between vertical and horizontal.

In addition to the foregoing benefits, the housings 20, 30 may protect the spring elements 50A, 50B from impacts, dust, corrosives and other environmental hazards.

While in the illustrated embodiment spring elements are shown in both of the housings 20, 30, such provision is not necessary in keeping with other embodiments of the invention. Moreover, according to further embodiments, the spacer 70 and the bearing 60 may be omitted.

The foregoing is illustrative of the present invention and is not to be construed as limiting thereof. Although several embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A suspension strut comprising:
    a) a housing assembly including first and second opposed housing members, said first and second housing members being relatively movable along an axis, at least said first housing member including an engagement surface; and
    b) at least one unitary, elastomeric spring member interposed between said first and second housing members, said at least one spring member being compressible and including a main body portion that comprises an axially extending inner wall that defines a substantially cylindrical axial passage having a first substantially constant lateral dimension, and an outer peripheral portion, the outer peripheral portion comprising a circumferential rib that terminates at an axially extending annular outer contact surface having a first axial dimension, the circumferential rib comprising first and second concave portions;
    c) wherein said strut is configured such that, when said first and second housing members are relatively displaced along said axis in a prescribed direction:
        said spring member is displaced axially relative to the housing assembly and said spring member is also axially compressed to provide a spring force opposing further relative displacement between said first and second housing members in said prescribed direction, and whereby as a result of such compression the inner wall of the main body portion is displaced into the axial passage and thereby decreases the lateral dimension of the substantially cylindrical axial passage; and
        said outer peripheral portion frictionally engages said engagement surface as the at least one spring member is displaced axially across an area of engagement to provide dynamic damping between said first and second housing members, substantially continuously during spring member displacement.

2. The suspension strut of claim 1 wherein the area of engagement between said peripheral portion and said engagement surface increases for a selected range of relative displacement between said first and second housing members in said prescribed direction and thereby increases the amount of said dynamic damping.

3. The suspension strut of claim 1 wherein said housing assembly and said spring member are relatively arranged and configured such that deflection of said spring member responsive to axial compression is limited by said housing assembly.

4. The suspension strut of claim 1 wherein said spring member is toroidally shaped.

5. The suspension strut of claim 1 including a plurality of said spring members in stacked relation.

6. The suspension strut of claim 5 including a separator plate interposed between at least two of said spring members.

7. The suspension strut of claim 1 wherein said first housing member includes a tubular sleeve having an inner surface and said engagement surface comprises a part of said inner surface.

8. The suspension strut of claim 1 wherein each of said first and second concave portions has a radius of between about 0.5 and 5 inches.

9. The suspension strut of claim 1 including:
a second tube forming a part of said second housing member, a first tube forming a part of said first housing member, said second tube being slidably received in said first tube, said first tube having a first engagement surface and second tube having a second engagement surface; and
the at least one compressible spring member comprising a first spring element disposed in said first tube and frictionally engaging said first engagement surface and a second spring element disposed in said second tube and frictionally engaging said second engagement surface.

10. The suspension strut of claim 9 including a spacer interposed between said first spring element and said second spring element, wherein said spacer is axially displaceable relative to each of said first and second tubes.

11. The suspension strut of claim 9 including a bearing member substantially surrounding said second tube and interposed between said first and second tubes.

12. A suspension strut comprising:
a) a housing assembly including:
a first housing member including a tube, said tube having an inner engagement surface;
a second housing member opposing said first housing member;
wherein said first and second housing members are relatively movable along an axis; and
b) a plurality of toroidally shaped, elastomeric, axially stacked spring members interposed between said first and second housing members and disposed in said tube of said first housing member, each of said spring members including a main body portion that comprises an axially extending inner wall that defines a substantially cylindrical axial passage having a first substantially constant lateral dimension, and a projection extending outwardly from the main body, the projection comprising a circumferential rib that terminates at an axially extending annular outer contact surface having a first axial dimension, the circumferential rib comprising first and second concave portions;
c) wherein said strut is configured such that, when said first and second housing members are relatively displaced along said axis in a prescribed direction:
said spring member is displaced axially relative to the housing assembly and said spring member is also axially compressed to provide a spring force opposing further relative displacement between said first and second housing members in said prescribed direction , and whereby as a result of such compression the inner wall of the main body portion is displaced into the axial passage and thereby decreases the lateral dimension of the substantially cylindrical axial passage; and
said outer contact surfaces frictionally engage said engagement surface as the at least one spring member is displaced axially across an area of engagement to provide dynamic damping between said first and second housing members substantially continuously during relative displacement between the first and second housing members;
d) wherein the area of engagement between said outer contact surface and said engagement surface increases for a selected range of relative displacement between said first and second housing members in said prescribed direction and thereby increases the amount of said dynamic damping; and
e) wherein said housing assembly and said spring member are relatively arranged and configured such that radial deflection of said spring member responsive to axial compression is limited by said housing assembly.

13. The suspension strut of claim 12 including a separator plate interposed between at least two of said spring members.

14. The suspension strut of claim 12 wherein each of said concave portions has a radius of between about 0.5 and 1.5 inches.

15. The suspension strut of claim 12 including: a second tube forming a part of said second housing member a first tube forming a part of the first housing member, said second tube being slidably received in said first tube, said first tube having a first inner engagement surface and said second tube having a second inner engagement surface;
a plurality of first spring elements disposed in said first tube and frictionally engaging said first inner engagement surface; and
a plurality of second spring elements disposed in said second tube and frictionally engaging said second inner engagement surface.

16. The suspension strut of claim 15 including a spacer interposed between said first spring elements and said second spring elements, wherein said spacer is axially displaceable relative to each of said first and second tubes.

17. The suspension strut of claim 15 including a bearing member substantially surrounding said second tube and interposed between said first and second tubes.

* * * * *